United States Patent
Niinuma et al.

(10) Patent No.: US 9,280,702 B2
(45) Date of Patent: Mar. 8, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Koichiro Niinuma, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/461,556

(22) Filed: Aug. 18, 2014

(65) Prior Publication Data

US 2015/0110364 A1  Apr. 23, 2015

(30) Foreign Application Priority Data

Oct. 22, 2013 (JP) ................. 2013-219673

(51) Int. Cl.
G06K 9/62 (2006.01)
G06K 9/00 (2006.01)

(52) U.S. Cl.
CPC ........ *G06K 9/00295* (2013.01); *G06K 9/00234* (2013.01); *G06K 9/00255* (2013.01); *G06K 9/00281* (2013.01); *G06K 9/00369* (2013.01); *G06K 9/00892* (2013.01); *G06K 9/6212* (2013.01)

(58) Field of Classification Search
None
See application file for complete search history.

(56) References Cited

U.S. PATENT DOCUMENTS

| 8,922,342 B1* | 12/2014 | Ashenfelter | G07C 9/00 340/5.52 |
| 2013/0051632 A1* | 2/2013 | Tsai | G06K 9/00892 382/118 |
| 2013/0114865 A1* | 5/2013 | Azar | G06F 21/32 382/118 |
| 2013/0215275 A1 | 8/2013 | Berini et al. | |

FOREIGN PATENT DOCUMENTS

| EP | 1 318 459 A1 | 6/2003 |
| EP | 1 990 769 A1 | 11/2008 |
| JP | 2004-302209 | 10/2004 |
| JP | 2007-318563 | 12/2007 |
| WO | WO02/23359 | 3/2002 |

OTHER PUBLICATIONS

Extended European Search Report issued Apr. 16, 2015 in corresponding European Patent Application No. 14182458.1.

(Continued)

*Primary Examiner* — Brian P Werner
(74) *Attorney, Agent, or Firm* — Staas & Halsey LLP

(57) ABSTRACT

An image processing device includes a processor; and a memory which stores a plurality of instructions, which when executed by the processor, cause the processor to execute: obtaining a first image in which a user is included, a second image which is imaged in an imaging condition different from that of the first image, a third image which is continuously imaged at a different point of time from that of the first image, and in the same imaging condition as that of the first image, and a fourth image which is continuously imaged at a different point of time from that of the second image, and in the same imaging condition as that of the second image; extracting a first feature amount of a user which is included in the first image, a second feature amount of the user which is included in the second image, a third feature amount.

17 Claims, 7 Drawing Sheets

(56) References Cited

OTHER PUBLICATIONS

Muhammad Khurram Khan et al., "Biometric Driven Initiative System for Passive Continuous Authentication", 2011 7$^{th}$ International Conference on Information Assurance and Security (IAS), Dec. 5, 2011, pp. 139-144.

Koichiro Niinuma et al., "Continuous User Authentication Using Temporal Information", Proceedings of SPIE, vol. 7667, Apr. 5, 2010.

M. Lalonde et al., "A system to automatically track humans and vehicles with a PTZ camera", SPIE Defense & Security: Visual Information Processing XVI (SPIE #6575), Orlando 2007.

Thomas Kailath, "The Divergence and Bhattacharyya Distance Measures in Signal Selection", *IEEE Transactions on Communication Technology,* Feb. 1967, pp. 52-60, vol. COM-15, No. 1.

Fabian Monrose et al., "Keystroke dynamics as a biometric for authentication", *Future Generation Computer Systems,* 2000, pp. 351-359, vol. 16.

Paul Viola et al., "Rapid Object Detection using a Boosted Cascade of Simple Features", *In Proc. IEEE Computer Vision and Pattern Recognition,* 2001, pp. I-511-I-518.

Alphan Altinok et al., "Temporal Integration for Continuous Multimodal Biometrics", *in Proc. Workshop on Multimodal User Authentication,* 2003, pp. 131-137.

Terence Sim et al., "Continuous Verification Using Multimodal Biometrics", *IEEE Transactions on Pattern Analysis and Machine Intelligence,* Apr. 2007, pp. 687-700, vol. 29, No. 4.

Koichiro Niinuma et al., "Soft Biometric Traits for Continuous User Authentication", *IEEE Transactions on Information Forensics and Security,* Dec. 2010, pp. 771-780, vol. 5, No. 4.

\* cited by examiner

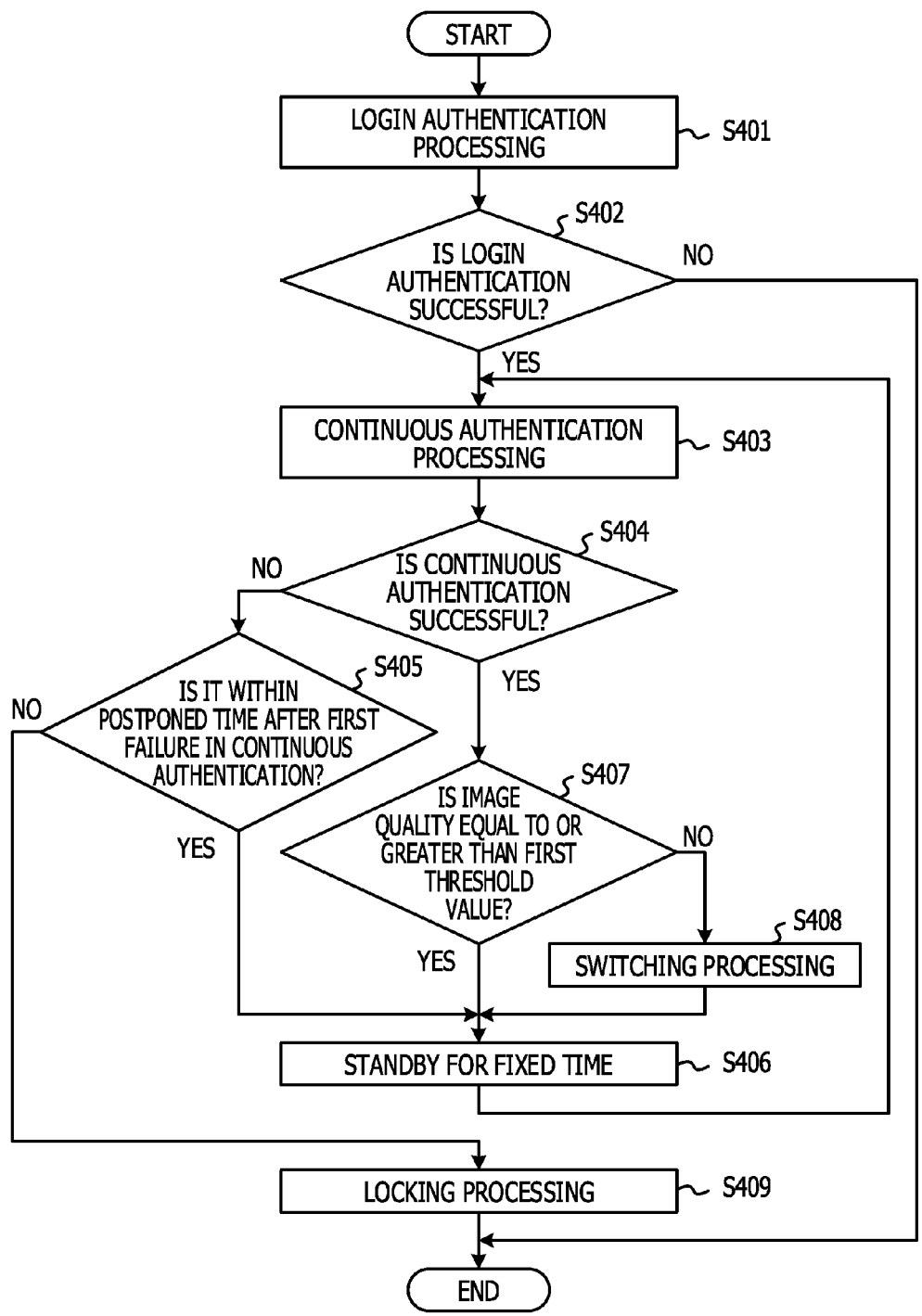

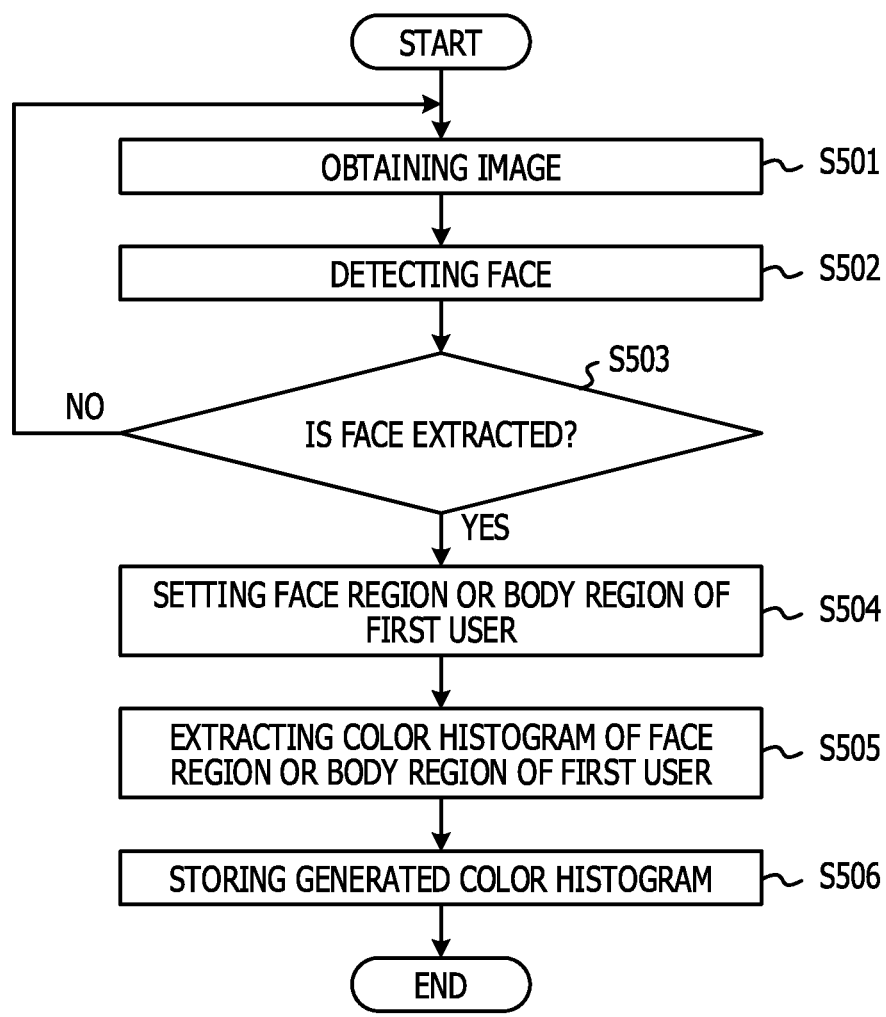

FIG. 6A
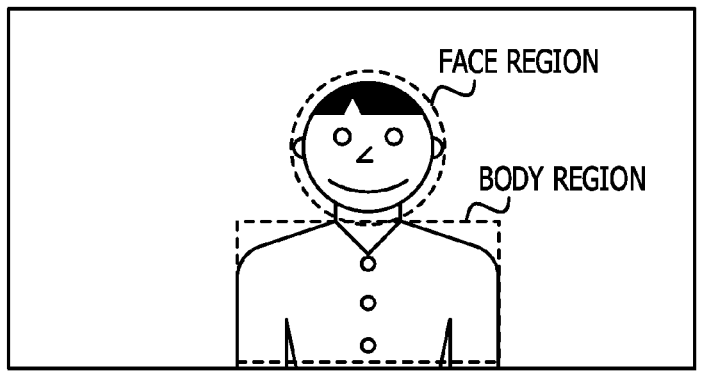
FIG. 6B
| | TARGET REGION | BODY REGION |
|---|---|---|
| REGION SHAPE/POSITION INFORMATION | SHAPE | RECTANGLE |
| | CENTER (x, y) | (200, 200) |
| | WIDTH | 200 |
| | HEIGHT | 150 |
| COLOR HISTOGRAM (R, G, B) | (15, 15, 15) | 0.01 |
| | (31, 15, 15) | 0.005 |
| | ... | ... |
| | (255, 255, 255) | 0.001 |
FIG. 6C
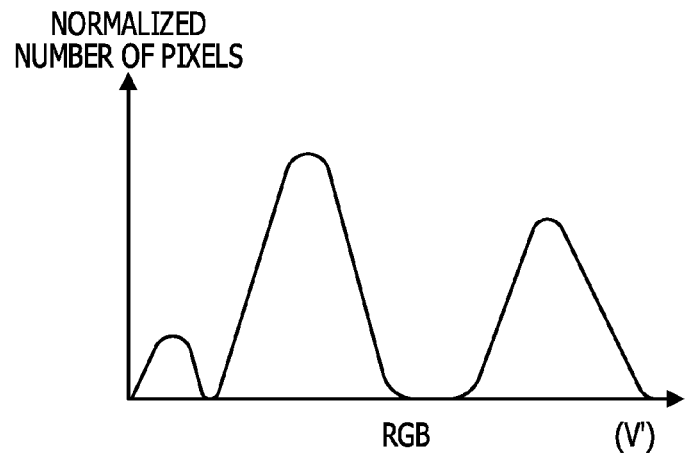

IMAGE PROCESSING DEVICE AND IMAGE PROCESSING METHOD

CROSS-REFERENCE TO RELATED APPLICATION

This application is based upon and claims the benefit of priority from the prior Japanese Patent Application No. 2013-219673 filed on Oct. 22, 2013, the entire contents of which are incorporated herein by reference.

FIELD

The embodiment described herein is related to an image processing device, an image processing method, and an image processing program which are used in continuous authentication of a user, for example.

BACKGROUND

In recent years, various types of information have been stored in information devices along with pervasive use of the information devices. As a result of this, establishment of a security technology of suppressing a leakage of information stored in the information device has become a very important issue, and various authentication techniques (for example, password authentication, biometric authentication, and card authentication) have been proposed. However, since most of existing authentication techniques perform authentication processing only at a time of login, in the case where an unauthorized person illegally uses an information device while an authorized user steps away from the information device, there is a common problem in which it is not possible to detect illegal use.

In order to solve the problem, a continuous authentication technique in which processing is continuously performed to authenticate a post-login user, has been proposed. As representative continuous authentication, there is continuous authentication due to face authentication using a feature vector. In the face authentication, the continuous authentication is executed such that a characteristic point group as a feature vector group in a face region corresponding to a monitored user is registered, and the user is recognized based on correlation between the registered characteristic point group and a characteristic point group which is extracted when performing authentication.

In addition, a color histogram authentication in which a color histogram of an image of a user is used has also been proposed. The color histogram authentication has an advantage in which robust continuous authentication is possible with respect to a change in posture of a user, compared to another method using the face authentication or the like. In the color histogram authentication, the continuous authentication is executed, for example, by registering a color histogram of a region (for example, body region) corresponding to a user in an image, detecting the body region of the user in the image based on a similarity of the registered color histogram and an imaged color histogram, and by tracking a movement thereof. As a technique related to such image processing, for example, documents of F. Monrose and A. D. Rubin, "Keystroke dynamics as a biometric for authentication," Future Generation Comput. Syst., vol. 16, pp. 351-359, 2000., A. Altinok and M. Turk, "Temporal integration for Continuous Multimodal Biometrics," in Proc. Workshop on Multimodal User Authentication, 2003, pp. 131-137., T. Sim, S. Zhang, R. Janakiraman, and S. Kumar, "Continuous Verification Using Multimodal Biometrics," IEEE Trans. Pattern Anal. Mach. Intell., vol. 29, no. 4, pp. 687-700, April 2007., and K. Niinuma, U. Park, A. K. Jain, "Soft Biometric Traits For Continuous User Authentication", IEEE Transactions on Information Forensics and Security (TIFS), Vol. 5, No. 4, pp. 771-780, 2, 2010. are disclosed.

SUMMARY

In accordance with an aspect of the embodiments, an image processing device includes a processor; and a memory which stores a plurality of instructions, which when executed by the processor, cause the processor to execute: obtaining a first image in which a user is included, a second image which is imaged in an imaging condition different from that of the first image, a third image which is continuously imaged at a different point of time from that of the first image, and in the same imaging condition as that of the first image, and a fourth image which is continuously imaged at a different point of time from that of the second image, and in the same imaging condition as that of the second image; extracting a first feature amount of a user which is included in the first image, a second feature amount of the user which is included in the second image, a third feature amount of the user which is included in the third image, and a fourth feature amount of the user which is included in the fourth image; continuously authenticating the user based on a comparison between the first feature amount and the third feature amount, or a comparison between the second feature amount and the fourth feature amount; and switching the comparison between the first feature amount and the third feature amount to the comparison between the second feature amount and the fourth feature amount which are performed in the authenticating by alternately obtaining the second image and the third image in the obtaining while the authentication is performed based on the comparison between the first feature amount and the third feature amount in the authenticating.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 4 is a flowchart of authentication processing using the continuous authentication apparatus;

FIG. 5 is a flowchart of initial registration processing using the image processing device;

FIG. 6A is a conceptual diagram of a face region and a body region when extracting a color histogram, FIG. 6B is a table which illustrates an example of a data structure of the color histogram, and FIG. 6C is a conceptual diagram of the color histogram.

DESCRIPTION OF EMBODIMENT

First, a problem in the related art will be described. In addition, the problem has been newly found as a result of examination of the related art in detail, and has not been known in the past. In the continuous authentication using the color histogram, imaging conditions of a camera (exposure value, sensitivity, focal distance, or the like) are fixed during the continuous authentication since a similarity of colors is used. However, it becomes clear that a similarity between a color histogram for authentication which is extracted for continuous authentication in advance and a color histogram for reference which is extracted during the continuous authentication is lowered (in other words, posture tolerance is lowered), since an image quality deteriorates (for example, luminance value is lowered) when a lighting condition is changed during the continuous authentication. In addition, the color histogram for authentication is extracted from an image which is imaged by obtaining authentication through login by a user, for example. However, there is a case in which imaging conditions of the image is not appropriate (for example, the user turns to the side, automatic setting of imaging condition of camera is not appropriate, or the like). The inventors have clarified that availability in the continuous authentication is lowered in such a case, through an extensive examination.

Hereinafter, examples of an image processing device, an image processing method, and an image processing program according to an embodiment will be described in detail based on drawings, while taking technological matters which are newly found due to the above described extensive examination of the inventors into consideration. In addition, the examples do not limit the technology of the present disclosure.

Figure 1:
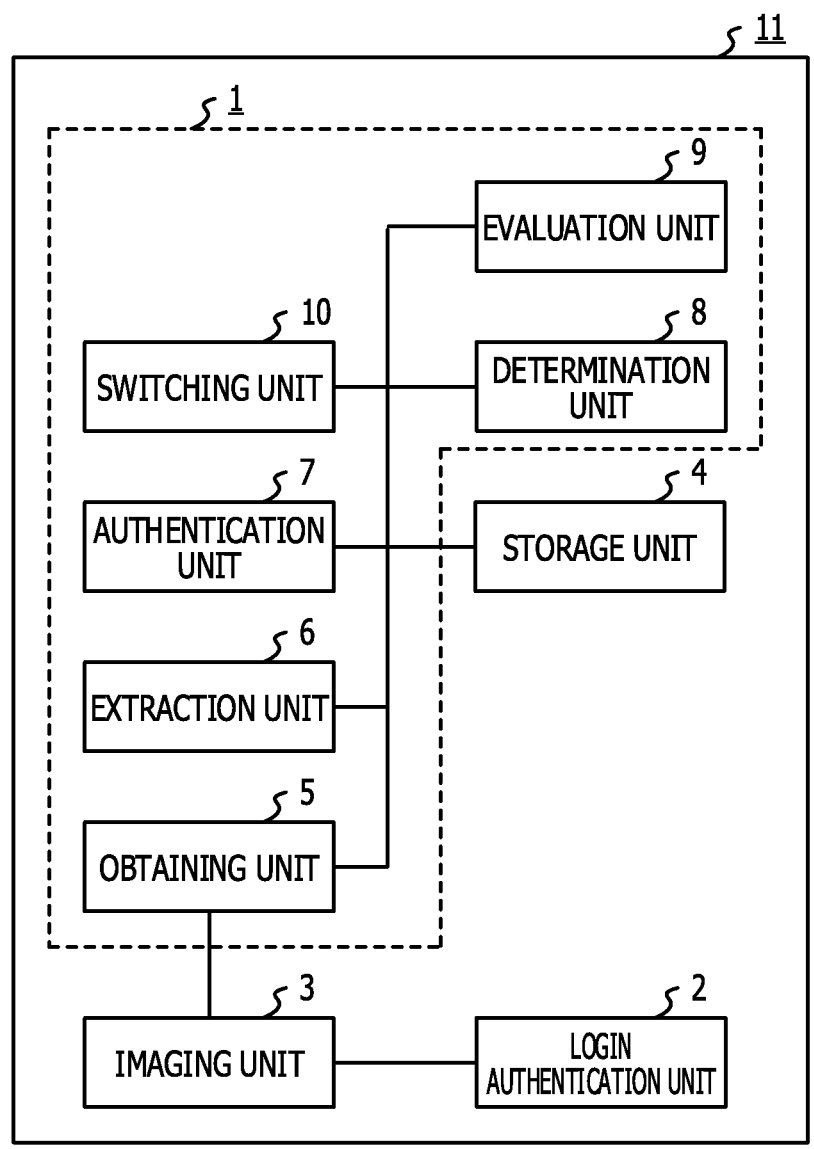
FIG. 1 is a functional block diagram of a continuous authentication apparatus in which an image processing device according to an embodiment is included.

FIG. 1 is a functional block diagram of a continuous authentication apparatus 11 in which an image processing device according to an embodiment is included. The continuous authentication apparatus 11 includes the image processing device 1, a login authentication unit 2, an imaging unit 3, and a storage unit 4. In addition, the image processing device 1 includes an obtaining unit 5, an extraction unit 6, an authentication unit 7, a determination unit 8, an evaluation unit 9, and a switching unit 10.

The continuous authentication apparatus 11 is, for example, an apparatus which performs authentication of a user who uses an information device such as a personal computer (PC), a mobile terminal, or the like. In addition, the continuous authentication apparatus 11 may be built in or connected to the information device such as the personal computer (PC), the mobile terminal, or the like, which is used by the user. In addition, it is also possible to cause the information device itself to function as the continuous authentication apparatus 11. In addition, it is also possible to cause a computer which is connected to the information device through a communication line to function as the continuous authentication apparatus 11. In Example 1, a continuous authentication apparatus 11 is described as an example of continuous authentication of a client authentication type, however, it is also possible to apply the continuous authentication apparatus to continuous authentication of a server authentication type using a communication line. For example, when performing continuous authentication of the server authentication type, information which is used in login authentication processing which will be described later or an image of a user is received from a client side. In addition, processing of each function included in the image processing device 1 is executed on the server side, and the client side may be informed of the authentication result.

The login authentication unit 2 is, for example, a hardware circuit using a wired logic. In addition, the login authentication unit 2 may be a functional module which is executed using a computer program executed in the continuous authentication apparatus 11. The login authentication unit 2 may execute login authentication processing of a user by applying any one of well-known various authentication methods (for example, password authentication, biometric authentication, and card authentication) as an authentication method of a user.

The imaging unit 3 is an imaging device such as a charge coupled device (CCD) camera, and a complementary metal oxide semiconductor (CMOS) camera. The imaging unit 3 uses the information device after the login authentication processing using the login authentication unit 2, for example, and captures an image including face regions (also referred to as first region) or a body region (also referred to as second region) which are user regions of a first user with a regular use authority, and a second user with no regular use authority who is not subjected to the login authentication processing at each predetermined time. In addition, the second user may be one person or may be any one of a plurality of persons other than the first user. The imaging unit 3 outputs the captured image to the obtaining unit 5.

Details of the image captured by the imaging unit 3 includes a first image, a second image, a third image, and a fourth image, for example, and a first user or a second user is included, for example. The first image is an image which is captured right after the login authentication processing using the login authentication unit 2, for example. The second image is an image which is captured under a different imaging condition from that of the first image, for example. The third image is an image which is continuously imaged at a different point in time from that of the first image, and under the same condition as that of the first image, for example. The fourth image is an image which is continuously imaged at a different point of time from that of the second image, and under the same condition as that of the second image, for example.

The storage unit 4 is a storage device such as a semiconductor memory element such as a flash memory, a hard disk drive (HDD), or an optical disc. In addition, the storage unit 4 is not limited to the above described storage devices, and may be a random access memory (RAM), a read only memory (ROM). Various data such as a color histogram, or the like, which is calculated by the image processing device 1 is stored as occasion calls in the storage unit 4. In addition, the storage unit 4 may not be included in the continuous authentication apparatus 11. For example, the various data may be stored in a cache, a memory, or the like, (not illustrated), of each functional unit included in the image processing device 1. In addition, it is also possible to provide the storage unit 4 in an external device other than the continuous authentication apparatus 11 through a communication line using a communication unit (not illustrated) which is provided in the continuous authentication apparatus 11 or the image processing device 1.

The obtaining unit 5 is a hardware circuit using a wired logic, for example. In addition, the obtaining unit 5 may be a functional module which is executed using the computer program executed in the image processing device 1. The obtaining unit 5 obtains the image (for example, first image, second image, third image, or fourth image) which is obtained when the imaging unit 3 performs photographing in each fixed time.

In addition, the obtaining unit 5 may also receive an image from a device other than the imaging unit 3. For example, the obtaining unit 5 may receive the image from an external device through a communication line using a communication unit (not illustrated). In this case, the imaging unit 3 may not be present in the continuous authentication apparatus 11. The obtaining unit 5 outputs the obtained image to the extraction unit 6, the determination unit 8, and the evaluation unit 9.

The extraction unit 6 is a hardware circuit using a wired logic, for example. In addition, the extraction unit 6 may be a functional module which is executed using the computer program executed in the image processing device 1. The extraction unit 6 receives an image (for example, first image, second image, third image, or fourth image) from the obtaining unit 5. The extraction unit 6 extracts a color histogram which is an example of a feature amount from the first region which is a part of user regions of the first user or the second user in the image. In addition, as described above, the first region illustrates a face region of a user, for example. In addition, the extraction unit 6 may extract a color histogram which is an example of a feature amount also from the second region which is a part of the user regions included in an image. In addition, as described above, the second region denotes a body region of a user, for example. In addition, a feature amount of the first region or the second region which is extracted from the first image is referred to as a first feature amount, a feature amount which is extracted from the second image is referred to as a second feature amount, a feature amount which is extracted from a third image is referred to as a third feature amount, and a feature amount which is extracted from a fourth image is referred to as a fourth feature amount. In addition, the first feature amount or the second feature amount may be referred to as a feature amount for authentication, and the third feature amount or the fourth feature amount may be referred to as a feature amount for reference. In addition, details of an extraction method of a color histogram which is an example of the first feature amount, the second feature amount, the third feature amount, or the fourth feature amount using the extraction unit 6 will be described later. The extraction unit 6 outputs the first feature amount, the second feature amount, the third feature amount, or the fourth feature amount which are extracted to the authentication unit 7.

The authentication unit 7 is a hardware circuit using a wired logic, for example. In addition, the authentication unit 7 may be a functional module which is executed using the computer program executed in the image processing device 1. The authentication unit 7 receives the first feature amount, the second feature amount, the third feature amount, or the fourth feature amount from the extraction unit 6. The authentication unit 7 continuously authenticates the first user based on a comparison between the first feature amount and the third feature amount or a comparison between the second feature amount and the fourth feature amount. The authentication unit 7 executes continuous authentication processing based on the comparison between the first feature amount and the third feature amount when starting the continuous authentication processing, and executes continuous authentication processing based on the comparison between the second feature amount and the fourth feature amount according to processing of the switching unit 10 which will be described later, for example. In addition, details of a method of comparison between the first feature amount and the third feature amount or a method of comparison between the second feature amount and the fourth feature amount using the authentication unit 7 will be described later.

The determination unit 8 is a hardware circuit using a wired logic, for example. In addition, the determination unit 8 may be a functional module which is executed using the computer program executed in the image processing device 1. The determination unit 8 receives the first image or the second image from the obtaining unit 5, for example, and determines an image quality of the first image or the second image (for example, luminance value). In addition, the determination unit 8 may determine an image quality of the first region or the second region with reference to a position of the first region or a position of the second region which is extracted by the extraction unit 6. The determination unit 8 outputs the determined image quality to the switching unit 10. In addition, the determination unit 8 may output an image quality which is obtained by averaging image qualities of a plurality of the first images or image qualities of a plurality of the second images to the switching unit 10.

The evaluation unit 9 is a hardware circuit using a wired logic, for example. In addition, the evaluation unit 9 may be a functional module which is executed using the computer program executed in the image processing device 1. The evaluation unit 9 receives the first image or the second image from the obtaining unit 5, for example. The evaluation unit 9 evaluates a stability of posture of a first user which is included in the first image or the second image. For example, the evaluation unit 9 evaluates the stability in posture based on a movement amount of the first region or second region which is included in the plurality of first images or second images. The evaluation unit 9 outputs the stability in posture to the switching unit 10. The evaluation unit 9 may define a movement amount as the stability in posture by setting a difference between a position of a frame at a point of time n of the first region or second region and a position of a frame at a point of time of n+1 to the movement amount. In addition, the evaluation unit 9 may not be provided in the image processing device 1, and may be provided in the image processing device as occasion calls.

The switching unit 10 is a hardware circuit using a wired logic, for example. In addition, the switching unit 10 may be a functional module which is executed using the computer program executed in the image processing device 1. The switching unit 10 receives the image quality from the determination unit 8, and receives the stability in posture from the evaluation unit 9 as occasion calls. When the image quality does not satisfy a predetermined first threshold value (for example, the first threshold value may be 30), the switching unit 10 causes the obtaining unit 5 to obtain the second image and the third image alternately while the authentication unit 7 is performing authentication based on the comparison between the first feature amount and the third feature amount. When a luminance value as an example of the image quality is less than the first threshold value, the switching unit 10 may determine that the first region or the second region is too dark. In addition, the switching unit 10 may set a plurality of threshold values. In this manner, it is also possible to determine that the first region or the second region is too bright. Subsequently, the switching unit 10 switches the comparison processing in the authentication unit 7 from the first feature amount and third feature amount to the second feature amount and fourth feature amount.

Figure 2:
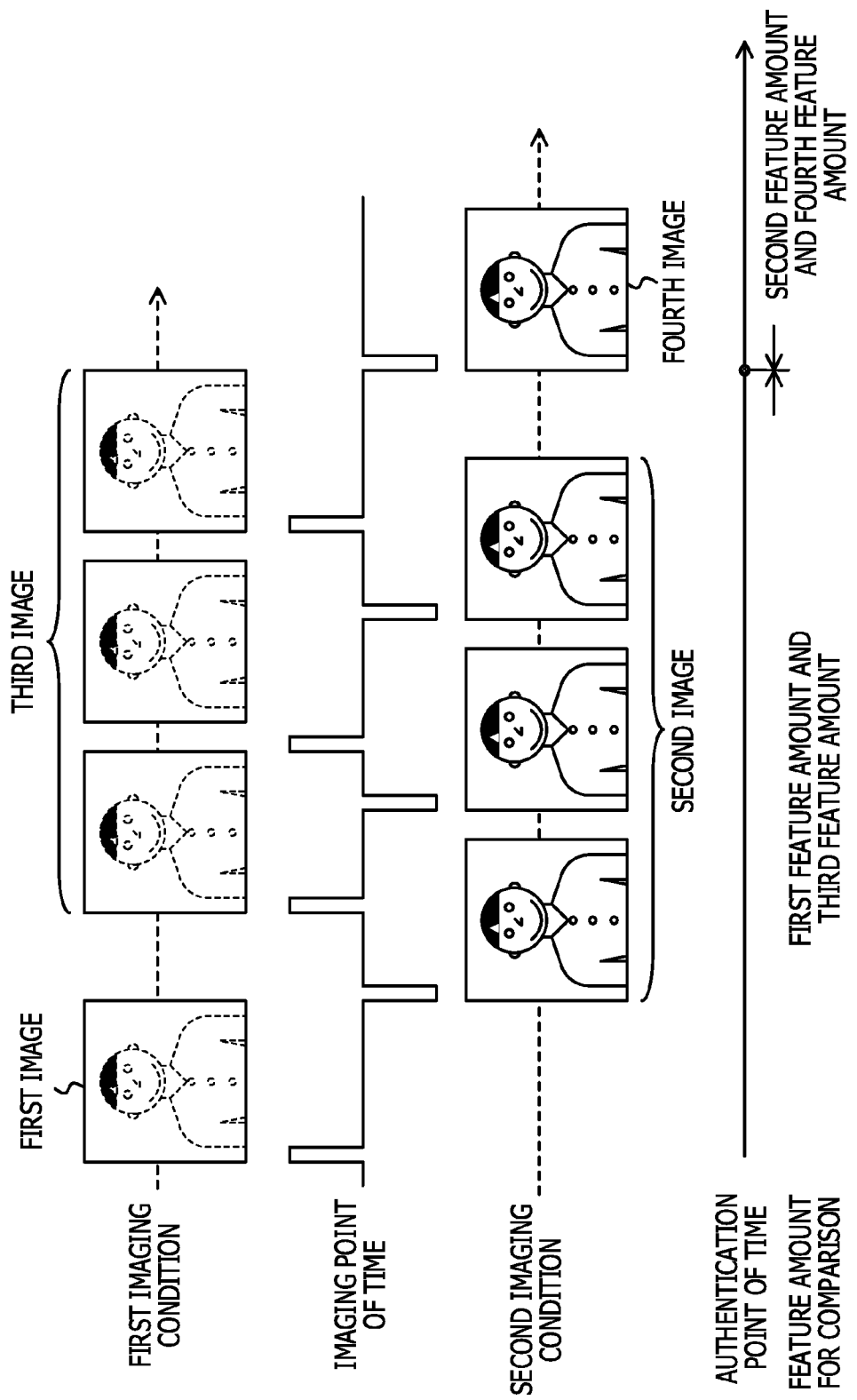
FIG. 2 is a conceptual diagram of switching processing using a switching unit.

FIG. 2 is a conceptual diagram of switching processing using the switching unit 10. The obtaining unit 5 obtains the first image due to login processing of the login authentication unit 2 according to time sequence illustrated in FIG. 2. The extraction unit 6 extracts the first feature amount from the first image, and outputs the first feature amount to the authentication unit 7 as a feature amount for authentication. The obtaining unit 5 continuously obtains the third image thereafter. The extraction unit 6 continuously extracts the third feature amount from the third image and outputs the third feature amount to the authentication unit 7 as a feature amount for reference. The authentication unit 7 continuously authenticates the first user by continuously comparing the first feature amount as the feature amount for authentication to the third feature amount as the feature amount for reference.

Here, the determination unit 8 determines an image quality of the first image, for example, and outputs the image quality of the first image to the switching unit 10. When it is determined that the image quality of the first image does not satisfy the first threshold value, the switching unit 10 causes the obtaining unit 5 to alternately obtain the second image and the third image while the authentication unit 7 is continuously comparing the first feature amount as the feature amount for authentication to the third feature amount as the feature amount for reference. In other words, since the authentication unit 7 continuously authenticates the first user while the obtaining unit 5 alternately obtains the second image and the third image, it is possible to regard the second feature amount which is extracted from the second image as a feature amount corresponding to the first user. In addition, it is possible for the obtaining unit 5 to define an obtaining interval of the second image and the third image as 1/30 seconds, for example. In this manner, it is possible to detect replacement of the first user by the second user in the obtaining interval of the second image and the third image. In addition, it is also possible for the extraction unit 6 to detect the replacement of the first user by the second user by comparing a position of the first region, or a position of the second region of the respective second image and third image.

Subsequently, the determination unit 8 determines the image quality of the second image, and outputs the image quality of the second image to the switching unit 10. When it is determined that the image quality of the second image is equal to or greater than the first threshold value (in other words, when determining that image quality of second image is better than image quality of first image), the switching unit 10 replaces the first feature amount by the second feature amount as the feature amount for registration. At this time, the extraction unit 6 may extract a second extraction amount by selecting one arbitrary second image from the plurality of second images. In addition, the switching unit 10 may replace the first feature amount by the second feature amount as the feature amount for registration based on the stability in posture which is evaluated by the evaluation unit 9. In this manner, it is possible for the authentication unit 7 to use the feature amount for registration based on a posture which is suitable for continuous authentication. When the extraction unit 6 extracts the second feature amount, the obtaining unit 5 continuously obtains the fourth image, and the extraction unit 6 extracts a fourth feature amount which becomes a feature amount for reference. At the same time, the switching unit 10 switches comparison processing of a feature amount in the authentication unit 7 from the first feature amount and third feature amount to the second feature amount and fourth feature amount. Due to the above described switching processing in the switching unit 10, it is possible to switch imaging conditions of the imaging unit 3 so as to obtain an image quality suitable for the continuous authentication without stopping the continuous authentication. In this manner, it is possible to provide an image processing device in which availability is improved.

Here, a control example of imaging conditions of the second image using the imaging unit 3 will be described. In Example 1, for ease of explanation, as a control value of the imaging conditions, an exposure value (may be referred to as shutter speed) is described as an example, however, it is possible to apply various control values such as gain, in addition to the exposure value. The imaging unit 3 may use a method of changing a set value using a fixed width, for example, as a control method of the exposure value. For example, a case in which the imaging unit 3 controls the exposure value to be $1/2n$ seconds (n is an integer) is taken into consideration. In this case, for example, when a luminance value of the first region or the second region of the first image which is captured using n=7 is dark (case in which condition of first threshold value is not satisfied), capturing of the second image may be performed using n of 6. When a luminance value of the second region of the second image which is captured using n of 6 is still dark, imaging of the second image may be performed again using n of 5.

Figure 3:
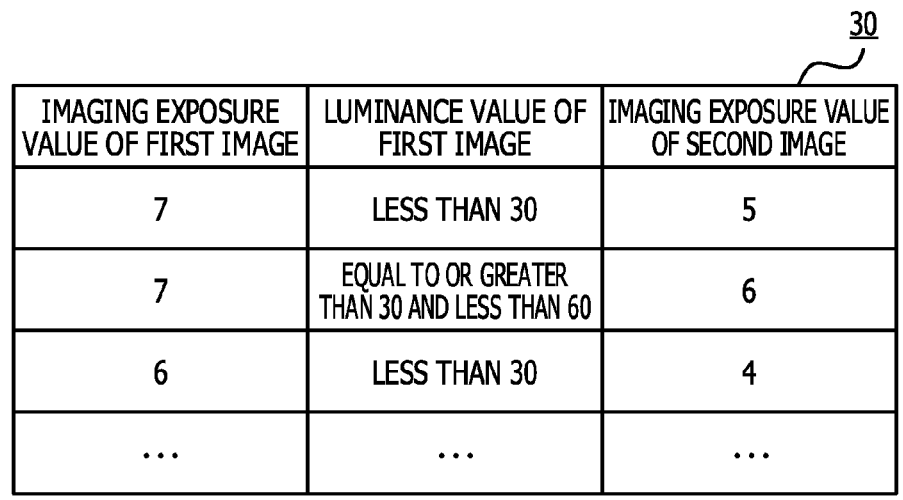
FIG. 3 is a table which illustrates an example of a data structure of an exposure value and a luminance value.

In addition, the imaging unit 3 may also define imaging conditions based on correlation between the exposure value and the luminance value instead of the above described gradual changing process of imaging conditions. FIG. 3 is a table which illustrates an example of a data structure of the exposure value and the luminance value. A table 30 in FIG. 3 may be stored in a cache or a memory (not illustrated) of the imaging unit 3, or in the storage unit 4 by being defined in advance when starting a use of the continuous authentication apparatus 11. A luminance value in the table 30 in FIG. 3 may be a luminance value of either the first region or the second region of the user, for example. The imaging unit 3 may control the luminance value of the first image to be in appropriate imaging conditions using a control process of one time, for example, by receiving the luminance value of the first image from the determination unit 8, and defining an exposure value which images the second image based on the exposure value and the luminance value of the first image with reference to the table 30 in FIG. 3.

FIG. 4 is a flowchart of authentication processing using the continuous authentication apparatus 11. The authentication processing illustrated in FIG. 4 is executed when a user starts to use the continuous authentication apparatus 11, or the information device to which the continuous authentication apparatus 11 is connected (or is built in). First, the login authentication unit 2 performs login authentication processing (step S401). It is possible to use any one of various authentication methods, which are well-known (for example, password authentication, biometric authentication, and card authentication) for an authentication method in the login authentication processing. Subsequently, the login authentication unit 2 determines whether or not it was possible to confirm that the user is a regular user, and is the first user, using the login authentication processing (step S402).

When the determination on the login authentication using the login authentication unit 2 is denied (No in step S402), the continuous authentication apparatus 11 ends the authentication processing. In this manner, it may be possible to prohibit a second user other than the first user who is a regular user from using the continuous authentication apparatus 11 or an information device to which the continuous authentication apparatus 11 is connected. In contrast, when the determination on the login authentication using the login authentication unit 2 is accepted (Yes in step S402), the login authentication unit 2 starts up the image processing device 1, and the image processing device 1 performs the continuous authentication processing (step S403). In addition, a detailed flow of an initial registration processing of the continuous authentication processing in step S403 will be described later. In addition, the continuous authentication in step S403 may be performed based on a result of comparison between the first feature amount and the third feature amount, or a result of comparison between the second feature amount and the fourth feature amount. In Example 1, at first, it is set such that the continuous authentication is performed based on a result of comparison between the first feature amount and the third feature amount.

When a determination on the continuous authentication using the image processing device 1 is denied (No in step S404), it is determined whether or not the continuous authentication is in a postponed time from the first continuous authentication (step S405). When the continuous authentication is not in the postponed time (No in step S405), locking processing with respect to the continuous authentication apparatus 11 or the information device to which the continuous authentication apparatus 11 is connected is performed (step S409). Here, the locking processing is processing, for example, in which the login authentication processing using the login authentication unit 2 may be performed again, by temporarily performing logout processing. In addition, the locking processing may be processing in which a manager or the like is informed of an alarm after making the information device in a non-active state, completely. In addition, the postponed time may be set to 10 seconds, for example.

On the other hand, when it is determined that the continuous authentication is acceptable including the fact that the continuous authentication is in the postponed time (Yes in step S405) by the image processing device 1 (Yes in step S404), the determination unit 8 determines whether or not an image quality of the first image is equal to or greater than the first threshold value (step S407). In step S407, when the image quality of the first image is the first threshold value or more (Yes in step S407), the image processing device 1 stands by for a fixed time (step S406), and repeatedly executes the continuous authentication processing (step S403).

In step S407, when the image quality of the first image is less than the first threshold value (No in step S407), the switching unit 10 performs switching processing using the above described method illustrated in FIG. 2 (step S408). Specifically, when it is determined that the image quality of the first image is less than the first threshold value, the switching unit 10 causes the obtaining unit 5 to alternately obtain the second image and the third image while the authentication unit 7 is continuously comparing the first feature amount which is the feature amount for authentication and the third feature amount which is the feature amount for reference. At this time, the determination unit 8 determines an image quality of the second image, and outputs the image quality of the second image to the switching unit 10. When it is determined that the image quality of the second image is equal to or greater than the first threshold value, the switching unit 10 replaces the first feature amount by the second feature amount as the feature amount for registration. At this time, the extraction unit 6 may extract a second extraction amount by selecting one arbitrary second image from a plurality of second images. In addition, in step S408, the switching unit 10 may replace the first feature amount by the second feature amount as the feature amount for registration based on stability in posture which is evaluated by the evaluation unit 9. Subsequently, when the extraction unit 6 extracts the second feature amount, the obtaining unit 5 continuously obtains the fourth image, and the extraction unit 6 extracts the fourth feature amount which is the feature amount for reference. At the same time, the switching unit 10 switches comparison processing of the feature amount in the authentication unit 7 from the first and third feature amounts to the second and fourth feature amounts.

In step S408, the image processing device 1 stands by for a fixed time after ending the switching processing (step S406), and repeatedly executes the continuous authentication processing (step S403). In this case, in step S403, the authentication unit 7 may perform the continuous authentication processing based on the second and fourth feature amounts. In addition, the above described fixed time in step S406 may be arbitrarily set by taking fastness, or the like, which is desired in the continuous authentication apparatus 11 into consideration. For example, the fixed time is set to either two seconds or five seconds.

Due to the above described processing, it is possible for a user who is confirmed to be the first user who is the regular user due to the login authentication to use the continuous authentication apparatus 11 or the information device to which the continuous authentication apparatus 11 is connected, while the continuous authentication processing is performed by the image processing device 1.

Subsequently, a detailed flow of the initial registration processing in the continuous authentication processing which is executed by the image processing device 1 in step S403 of the authentication processing illustrated in FIG. 4 will be described. FIG. 5 is a flowchart of the initial registration processing using the image processing device 1. In step S403 of the continuous authentication processing illustrated in FIG. 4, the initial registration processing illustrated in FIG. 5 is firstly performed.

First, the obtaining unit 5 obtains a first image which is captured by the imaging unit 3 (step S501). Subsequently, the extraction unit 6 detects a face of the first user which is included in the first image by receiving the image from the obtaining unit 5 (step S502). In addition, when detecting the face, it is possible to use, for example, an arbitrary well-known method such as a Haar classifier which is disclosed in P. Viola and M. Jones, "Rapid object detection using a boosted cascade of simple features," in Proc. IEEE Computer Vision and Pattern Recognition, pp. I-511-I-518, 2001. The extraction unit 6 determines whether or not the face of the first user is eligibly extracted (step S503).

When eligibility for extracting the face of the first user is denied (No in step S503), due to a case in which the face of the first user does not face the front face of the imaging unit 3 at a time of photographing using the imaging unit 3, a case in which the first user is in operation, or the like, imaging by the imaging unit 3 is executed again, and then obtaining of an image using the obtaining unit 5 is executed (step S501). In addition, whether or not the first user is in operation may be determined based on a movement amount of a position of the face included in the plurality of first image, for example. In addition, in step S503, when the eligibility of the extraction of the face of the first user is denied more than a fixed number of times, the locking processing in step S409 in FIG. 4 may be performed after ending the initial registration processing. On the other hand, when the eligibility of the face extraction is accepted in FIG. 5 (yes in step S503), the extraction unit 6 sets a fixed shape (for example, circular shape, elliptical shape, and rectangular shape) corresponding to the face of the first user to a face region (first region) (step S504). In addition, the extraction unit 6 sets a fixed shape (for example, rectangular shape, oval shape, and semicircular shape) on the lower part of the set face region corresponding to a part of a body of the first user to a body region (second region) (step S504). In addition, it is possible to set the body region, for example, to a horizontal width of twice, or to the equal vertical width with respect to the face region.

FIG. 6A is a conceptual diagram of the face region and the body region when extracting a color histogram. In the example illustrated in FIG. 6A, a face region of which a shape is circular and a body region of which a shape is rectangular are set. In addition, it is possible to improve determination precision of similarity in which the color histogram is used, since a color of hair of the user is included as a feature amount by including the head in the face region, as illustrated in FIG. 6A. In addition, the extraction unit 6 may set the face region as the first region in the extraction of the color histogram. In addition, the body region may be set as the second region in the extraction of the color histogram, by taking uniqueness of clothes of the user into consideration.

In FIG. 5, the extraction unit 6 extracts the color histogram of the face region or the body region of the first user which is set in step S504 (step S505). When RGB levels of pixels of an image respectively are 256 gradations, for example, the extraction unit 6 divides each component of an RGB color space into 16 with respect to a target pixel of the face region or the body region in the image, and makes the color component into 16×16×16=4096 grayscales. Here, bin Vr' which is obtained by dividing R into 16, by setting a pixel value of R to Vr (0 to 255) may be expressed as the following expression.

$$Vr' = Vr \times 16 \div 256 \quad \text{(Expression 1)}$$

In addition, since it is possible to calculate bin Vg', which is obtained by dividing G into 16 by setting a pixel value of G to Vg (0 to 255), and bin Vb', which is obtained by dividing B into 16 by setting a pixel value of B to Vg (0 to 255), using the same method as that of the above described Vr', detailed descriptions thereof will be omitted. The extraction unit 6 calculates a pixel level V' which is made into 4096 grayscales expressed in the following expression, using the calculated bin Vr', bin Vg', and bin Vb'.

$$V' = Vr' \times 16 \times 16 + Vg' \times 16 + Vb' \quad \text{(Expression 2)}$$

The extraction unit 6 sets an arrangement in which a sum of pixels in the face region or the body region is obtained to a color histogram with respect to each grayscale which is made into 4096 grayscales. FIG. 6B is a table which illustrates an example of a data structure of a color histogram. FIG. 6B illustrates a data structure of a color histogram of the body region, for example, however, since it is also possible to express the data structure of a color histogram of the face region using the same data structure, detailed descriptions thereof will be omitted. As illustrated in FIG. 6B, the extraction unit 6 may store supplementary information such as a shape of the body region, position information of the shape, or the like, in a table as shape-position information as occasion calls. In FIG. 6B, it is denoted that the shape is a rectangle, a center of the body region is located in coordinates (200, 200) in which an upper left end of the image is the origin, for example, and the size is configured of the width of 200 pixels and the height of 150 pixels. In addition, the color histogram (R, G, and B) illustrated in FIG. 6B denotes a color histogram using a ratio of color which is included in a range of each numerical value of the above described bin Vr', bin Vg', and bin Vb'. For example, the color histogram (15, 15, 15) illustrated in FIG. 6B denotes that a ratio to a total pixel number of a color in a range of the numerical value of (R, G, B)=(0, 0, 0) to (15, 15, 15) is 0.01, that is, 1%. In addition, it is also possible for the extraction unit 6 to use a color space (for example, HVS color space) other than the RGB color space when extracting the color histogram.

FIG. 6C is a conceptual diagram of a color histogram. As illustrated in FIG. 6C, when a region size of a color histogram (number of pixels included in region) as a comparison target is different, the extraction unit 6 may generate a normalized histogram in which the number of pixels are normalized using an arbitrary standard region size by taking into consideration the fact that calculation processing of similarity of color histograms which are different from each other becomes complicated.

In FIG. 5, the extraction unit 6 stores the color histogram which is extracted in step S505 in a cache or a memory (not illustrated) in the authentication unit 7 or the storage unit 4 as the first feature amount (step S506), and the image processing device 1 ends the initial registration processing illustrated in the flowchart in FIG. 3. In addition, the extraction unit 6 may extract the second feature amount, the third feature amount, and the fourth feature amount using the same method as that of the extraction method of the above described first feature amount.

Here, a comparison method of the first feature amount and the third feature amount or the second feature amount and the fourth feature amount using the authentication unit 7 will be described in detail. The authentication unit 7 calculates similarity (similarity of color histogram) of the first feature amount and the third feature amount or the second feature amount and the fourth feature amount, and determines whether or not the similarity is a color histogram authentication threshold value (Thc, for example, Thc may be set to 90%), which is equal to or greater than a predetermined threshold value. When calculating the similarity of the color histogram, it is possible to use various well-known methods, however, it is possible to use the Bhattacharyya distance, for example. With respect to a similarity calculation using the Bhattacharyya's distance, for example, it is possible to use a calculation method which is disclosed in Kailath T. "The Divergence AND Bhattacharyya Distance Measures in Signal Selection". IEEE Transactions on Communication Technology 15 (1) pp. 52-60, 1967. In addition, as illustrated in FIG. 6C, when generating a normalized color histogram, it is possible to calculate a similarity p using the following expression by setting the first feature amount or the second feature amount to pu, and the third feature amount or the fourth feature amount to qu.

$$\rho = \sum_{u=1} \sqrt{puqu} \quad \text{(Expression 3)}$$

In addition, when performing an authentication determination by combining a similarity of color histograms of a face region which is the first region and a body region which is the second region, and when a similarity of the color histogram of the face region is set to Sface, and a similarity of the color histogram of the body region is set to Sbody, the authentication unit 7 may calculate a total similarity Stotal using the following expression, for example.

$$Stotal = t \times Sface + (1-t) \times Sbody \quad \text{(Expression 4)}$$

Here, t is a weighed coefficient with respect to the similarity Sface of the color histogram of the face region, and is 0≤t≤1.

According to the image processing device 1 in Example 1, it is possible to switch imaging conditions so as to become an image quality appropriate for the continuous authentication without stopping the continuous authentication. In this manner, it is possible to provide an image processing device of which availability is improved.

Example 2

Figure 7:
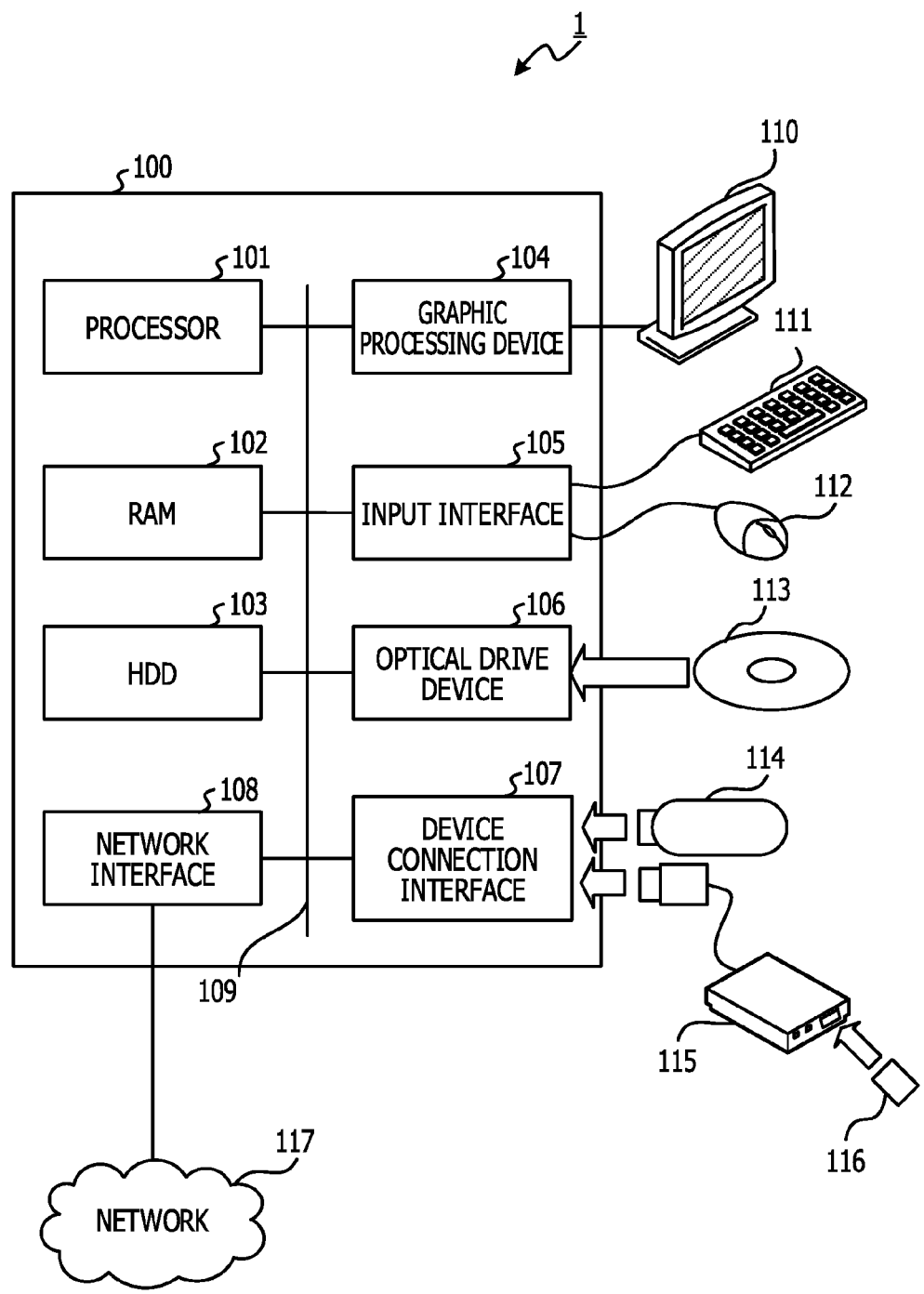
FIG. 7 is a hardware configuration diagram of a computer which functions as the image processing device according to the embodiment.

FIG. 7 is a hardware configuration diagram of a computer which functions as the image processing device 1 according to the embodiment. As illustrated in FIG. 7, the image processing device 1 is configured by including a computer 100, and an input-output device (peripheral device) which is connected to the computer 100.

The entire apparatus of the computer 100 is controlled by a processor 101. The processor 101 is connected with a random access memory (RAM) 102 and a plurality of the peripheral devices through a bus 109. In addition, the processor 101 may be a multiprocessor. In addition, the processor 101 is a CPU, a micro processing unit (MPU), a digital signal processor (DSP), an application specific integrated circuit (ASIC), or a programmable logic device (PLD), for example. In addition, the processor 101 may be configured by combining two or more elements among the CPU, MPU, DSP, ASIC, and the PLD. In addition, the processor 101 may execute processing of functional blocks of the obtaining unit 5, the extraction unit 6, the authentication unit 7, the determination unit 8, the evaluation unit 9, the switching unit 10, or the like, illustrated in FIG. 1, for example.

The RAM 102 is used as a main storage unit of the computer 100. At least a part of a program of an operating system (OS) or an application program which is executed in the processor 101 is temporarily stored in the RAM 102. In addition, various data items which are used in processing using the processor 101 are stored in the RAM 102.

As the peripheral devices which are connected to the bus 109, there are a hard disk drive (HDD) 103, a graphic processing device 104, an input interface 105, an optical drive device 106, a device connection interface 107, and a network interface 108.

The HDD 103 magnetically performs reading and writing of data with respect to a built-in disk. The HDD 103 is used as an auxiliary storage unit of the computer 100, for example. A program of the operating system, an application program, and various data are stored in the HDD 103. In addition, it is also possible to use a semiconductor memory such as a flash memory as the auxiliary storage unit.

A monitor 110 is connected to the graphic processing device 104. The graphic processing device 104 displays various images on a screen of the monitor 110 according to a command from the processor 101. As the monitor 110, there is a display device using a cathode ray tube (CRT) or a liquid crystal display device.

A keyboard 111 and a mouse 112 are connected to the input interface 105. The input interface 105 transmits a signal which is sent from the keyboard 111 or the mouse 112 to the processor 101. In addition, the mouse 112 is an example of a pointing unit, and it is also possible to use another pointing unit. As another pointing device, there is a touch panel, a tablet, a touch pad, a track ball, or the like.

The optical drive device 106 reads data which is recorded in an optical disc 113 using laser light or the like. The optical disc 113 is a portable recording medium in which data is recorded so that reading is possible using a reflection of light. As the optical disc 113, there is a digital versatile disc (DVD) a DVD-RAM, a compact disc read only memory (CD-ROM), a CD-R (Recordable)/RW (Rewritable), or the like. A program which is stored in the optical disc 113 as a portable recording medium is installed in the image processing device 1 through the optical drive device 106. A predetermined program which is installed may be executed using the image processing device 1.

The device connection interface 107 is a communication interface for connecting peripheral devices to the computer 100. For example, it is possible to connect a memory unit 114 or a memory reader and writer 115 to the device connection interface 107. The memory unit 114 is a recording medium which is equipped with a communication function with the device connection interface 107. The memory reader and writer 115 is a unit which performs writing of data with respect to a memory card 116 or reads data from the memory card 116. The memory card 116 is a card-type recording medium.

The network interface 108 is connected to a network 117. The network interface 108 performs transceiving of data with another computer or a communication device through the network 117.

The computer 100 executes the above described image processing function by executing a program which is recorded in a computer readable recording medium, for example. The program in which processing contents to be executed in the computer 100 are described may be recorded in various recording mediums. The program may be configured of one or a plurality of functional modules. For example, it is possible to configure the program using a functional module which executes processing of the obtaining unit 5, the extraction unit 6, the authentication unit 7, the determination unit 8, the evaluation unit 9, the switching unit 10, and the like, which are illustrated in FIG. 1. In addition, it is possible to store the program which is executed by the computer 100 in the HDD 103. The processor 101 downloads at least a part of the program in the HDD 103 to the RAM 102, and executes the program. In addition, it is also possible to record the program which is executed by the computer 100 in a portable recording medium such as the optical disc 113, the memory unit 114, or the memory card 116. The program which is stored in the portable recording medium is installed in the HDD 103 under control of the processor 101, for example, and may be executed thereafter. It is also possible for the processor 101 to execute the program by directly reading the program from the portable recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute:
obtaining a first image in which a user is included, a second image which is imaged in an imaging condition different from that of the first image, a third image which is continuously imaged at a different point of time from that of the first image, and in the same imaging condition as that of the first image, and a fourth image which is continuously imaged at a different point of time from that of the second image, and in the same imaging condition as that of the second image;
extracting a first feature amount of a user which is included in the first image, a second feature amount of the user which is included in the second image, a third feature amount of the user which is included in the third image, and a fourth feature amount of the user which is included in the fourth image;

continuously authenticating the user based on a comparison between the first feature amount and the third feature amount, or a comparison between the second feature amount and the fourth feature amount; and switching the comparison between the first feature amount and the third feature amount to the comparison between the second feature amount and the fourth feature amount which are performed in the authenticating by alternately obtaining the second image and the third image in the obtaining while the authentication is performed based on the comparison between the first feature amount and the third feature amount in the authenticating.

2. The device according to claim 1,
wherein the first feature amount, the second feature amount, the third feature amount, and the fourth feature amount are color histograms.

3. The device according to claim 1,
wherein the plurality of instructions cause the processor to execute determining an image quality of the first image, and
wherein, in the switching, the comparison between the first feature amount and the third feature amount is switched to the comparison between the second feature amount and the fourth feature amount which are performed in the authenticating when the image quality of the first image is less than a predetermined first threshold value.

4. The device according to claim 3,
wherein, in the determining, an image quality of the second image is further determined, and
wherein, in the switching, a comparison between the first feature amount and the third feature amount is switched to a comparison between the second feature amount and the fourth feature amount which are performed in the authenticating when an image quality of the second image is equal to or greater than the first threshold value.

5. The device according to claim 4,
wherein, in the determining, the image quality of the first image or the image quality of the second image is determined based on a luminance value of a first region or a second region of the user which is used when extracting the first feature amount.

6. The device according to claim 5,
wherein the first region is a face region of the user, and the second region is a body region of the user.

7. The device according to claim 1,
wherein the plurality of instructions cause the processor to execute evaluating stability in posture of the user which is included in the first image or the second image, and
wherein, in the switching, the comparison between the first feature amount and the third feature amount is switched to the comparison between the second feature amount and the fourth feature amount which are performed in the authenticating based on the stability in posture.

8. The device according to claim 7,
wherein the evaluating evaluates the stability in posture based on a movement amount of the first region or the second region which is included in the plurality of first images or the plurality of second images.

9. An image processing method comprising:
obtaining a first image in which a user is included, a second image which is imaged in an imaging condition different from that of the first image, a third image which is continuously imaged at a different point of time from that of the first image, and in the same imaging condition as that of the first image, and a fourth image which is continuously imaged at a different point of time from that of the second image, and in the same imaging condition as that of the second image;

extracting, by a computer processor, a first feature amount of a user which is included in the first image, a second feature amount of the user which is included in the second image, a third feature amount of the user which is included in the third image, and a fourth feature amount of the user which is included in the fourth image;

continuously authenticating the user based on a comparison between the first feature amount and the third feature amount, or a comparison between the second feature amount and the fourth feature amount; and switching the comparison between the first feature amount and the third feature amount to the comparison between the second feature amount and the fourth feature amount which are performed in the authenticating by alternately obtaining the second image and the third image in the obtaining while the authentication is performed based on the comparison between the first feature amount and the third feature amount in the authenticating.

10. The method according to claim 9,
wherein the first feature amount, the second feature amount, the third feature amount, and the fourth feature amount are color histograms.

11. The method according to claim 9, further comprising:
determining an image quality of the first image,
wherein, in the switching, the comparison between the first feature amount and the third feature amount is switched to the comparison between the second feature amount and the fourth feature amount which are performed in the authenticating when the image quality of the first image is less than a predetermined first threshold value.

12. The method according to claim 10,
wherein, in the determining, an image quality of the second image is further determined, and
wherein, in the switching, a comparison between the first feature amount and the third feature amount is switched to a comparison between the second feature amount and the fourth feature amount which are performed in the authenticating when an image quality of the second image is equal to or greater than the first threshold value.

13. The method according to claim 12,
wherein, in the determining, the image quality of the first image or the image quality of the second image is determined based on a luminance value of a first region or a second region of the user which is used when extracting the first feature amount.

14. The method according to claim 13,
wherein the first region is a face region of the user, and the second region is a body region of the user.

15. The method according to claim 9, further comprising:
evaluating stability in posture of the user which is included in the first image or the second image,
wherein, in the switching, the comparison between the first feature amount and the third feature amount is switched to the comparison between the second feature amount and the fourth feature amount which are performed in the authenticating based on the stability in posture.

16. The method according to claim 15,
wherein the evaluating evaluates the stability in posture based on a movement amount of the first region or the second region which is included in the plurality of first images or the plurality of second images.

17. A computer-readable non-transitory storage medium storing an image processing program that causes a computer to execute a process comprising:

obtaining a first image in which a user is included, a second image which is imaged in an imaging condition different from that of the first image, a third image which is continuously imaged at a different point of time from that of the first image, and in the same imaging condition as that of the first image, and a fourth image which is continuously imaged at a different point of time from that of the second image, and in the same imaging condition as that of the second image;

extracting a first feature amount of a user which is included in the first image, a second feature amount of the user which is included in the second image, a third feature amount of the user which is included in the third image, and a fourth feature amount of the user which is included in the fourth image;

continuously authenticating the user based on a comparison between the first feature amount and the third feature amount, or a comparison between the second feature amount and the fourth feature amount; and switching the comparison between the first feature amount and the third feature amount to the comparison between the second feature amount and the fourth feature amount which are performed in the authenticating by alternately obtaining the second image and the third image in the obtaining while the authentication is performed based on the comparison between the first feature amount and the third feature amount in the authenticating.

* * * * *